(12) United States Patent
Al Jabri

(10) Patent No.: US 9,246,888 B2
(45) Date of Patent: Jan. 26, 2016

(54) SYSTEMS AND METHODS FOR SECURE COMMUNICATION OVER AN UNSECURED COMMUNICATION CHANNEL

(71) Applicant: Abdulrahman Al Jabri, Riyadh (SA)

(72) Inventor: Abdulrahman Al Jabri, Riyadh (SA)

( * ) Notice: Subject to any disclaimer, the term of this patent is extended or adjusted under 35 U.S.C. 154(b) by 69 days.

(21) Appl. No.: 14/287,037

(22) Filed: May 25, 2014

(65) Prior Publication Data

US 2015/0341325 A1 Nov. 26, 2015

(51) Int. Cl.
*H04L 9/32* (2006.01)
*H04L 29/06* (2006.01)
*H04L 9/30* (2006.01)
*H04L 9/08* (2006.01)

(52) U.S. Cl.
CPC .......... *H04L 63/0442* (2013.01); *H04L 9/0825* (2013.01); *H04L 9/30* (2013.01); *H04L 9/3268* (2013.01); *H04L 63/0823* (2013.01); *G06F 2221/2153* (2013.01)

(58) Field of Classification Search
CPC .............. H04L 63/0823; H04L 9/0825; G06F 2221/2153; G06F 21/33; G06F 21/34
USPC .............................. 713/156, 172–173; 726/9
See application file for complete search history.

(56) References Cited

U.S. PATENT DOCUMENTS

| | | | | |
|---|---|---|---|---|
| 6,993,521 B2* | 1/2006 | Aull | ...................... | G06F 21/335 707/999.007 |
| 7,302,487 B2* | 11/2007 | Ylonen | ............... | H04L 63/0272 709/220 |
| 7,302,703 B2* | 11/2007 | Burns | ..................... | G06F 21/34 713/155 |
| 2002/0143987 A1* | 10/2002 | Sadler | ..................... | H04L 12/58 709/238 |
| 2004/0250077 A1* | 12/2004 | Jang | ................... | G06Q 20/1235 713/175 |
| 2005/0188202 A1* | 8/2005 | Popp | ..................... | H04L 9/3263 713/175 |
| 2008/0005567 A1* | 1/2008 | Johnson | ............ | G06Q 20/3552 713/172 |
| 2009/0037729 A1* | 2/2009 | Smith | ................... | H04L 9/3234 713/158 |

* cited by examiner

*Primary Examiner* — Samson Lemma
(74) *Attorney, Agent, or Firm* — Ditthavong & Steiner, P.C.

(57) ABSTRACT

A system and method for secure data transmission over an unsecured communication channel by means of public key cryptography is disclosed. A plurality of digital certificates associated with a plurality of user devices within a peer network are maintained at each of the user devices in a certificate database. Each user device is assigned with a secure hardware token. The hardware token stores a private key and a local encryption key associated with the corresponding device. In order to transfer data between a first user device and a second user device, a public key of second user device stored in the certificate database is used to encrypt a data to be transferred from a first user device to the second user device within the peer network. At the second user device, the encrypted data is decrypted using a private key associated with the second user device to retrieve the data.

18 Claims, 8 Drawing Sheets

SYSTEMS AND METHODS FOR SECURE COMMUNICATION OVER AN UNSECURED COMMUNICATION CHANNEL

FIELD OF THE INVENTION

The invention relates to secure data transmission, more specifically the invention relates to secure data transmission over unsecured communication network using public key cryptography.

BACKGROUND OF THE INVENTION

Data security and authenticity over an unsecured network is a major concern for the e-business. Data traveling over an open network is visible to unauthorized users and hackers. To address this problem the concept of cryptography was introduced in order to generate cipher text from plain text to be transmitted over the network. The concept of using Private and Public key for encryption and decryption of data is well known in the art. However, the public key cryptography requires maintaining records of all the users who are assigned the pair of private and public key. Further, if the pair of private and public key is compromised, any unauthorized user can generate a false identity and transfer data to other users, using the false identity.

To address this problem, the concept of digital signature was introduced. The digital signature is generated by a registration authority (RA). The digitally signed document acts as the proof for data integrity and authenticity of the user transmitting data. For this purpose, the digital certificate needs to be signed by a certification authority (CA) such that other users of the system can verity with the CA that the digital certificate belongs to a genuine user. The root certification authority (R-CA), certification authority (CA), and registration authority (RA) together constitute a Public Key Infrastructure (PKI).

The Public Key Infrastructure (PKI) provides an infrastructure to generate, distribute, revoke and update digital certificates for a plurality of users communicating over a network. The PKI generates a public key and a private key for each of the certificate holders. The digital certificate is generated using identification information associated with the user and is digitally signed by a certification authority (CA). The digital certificate further stores the private key of the user who is assigned the digital certificate. Whenever a secured data transfer is to be done between a sender and a receiver, the digitally signed certificate of the sender is attached to the data to be transferred. The complete set of data and digital signature is encrypted using the public key of the receiver to generate an encrypted message and transferred to the receiver where the private key of the receiver is used to decrypt the encrypted message. The digital certificate is used to verify the identity of the sender.

However, many a times there are situations where the private key of the user is compromised to an intruder. In such a case, the encrypted data can be easily accessed by an intruder. Now a day's hardware tokens such as smartcard, USB drives are used to provide more security to the private key and digital certificate. As a result, only a person with secure hardware token can access the private key and securely transfer data. However, the existing PKI system does not provide any means to remotely manage the digital certificate stored on the hardware token. Further, the existing PKI system does not provide any means by which the digital certificate can be updated, revoked or even canceled. Furthermore, the existing infrastructure does not provide any means to secure the data and log file of data transfer between a sender and a receiver.

As discussed above the existing hardware based PKI Framework has various limitations related to security of data, authenticity of data and maintenance of hardware tokens.

SUMMARY

An aspect of the invention is to enable a secure hardware token based Public Key infrastructure (PKI).

Another aspect of the invention is to enable a communication channel such as PSTN, GSM to transfer the data securely.

Yet another aspect of the invention is to provide an end to end solution for data transfer between two devices using a scanning and a printing means.

Another aspect of the invention is to distribute the administrative rights of the PKI system across a hierarchical structure of administrative bodies.

Another aspect of the invention is to maintain a database of digital certificates of all the users in a peer network at each of the user devices in the peer network.

Additional aspect of the invention is enable secure transfer of Color Scan, Monochrome Scan, Voice Call, Video Calls, Chats, Files and Folders over the communication channel.

A system and method for secure data transmission over an unsecured communication channel using public key cryptography is disclosed. For this purpose, a plurality of digital certificates associated with a plurality of user devices within a peer network are maintained at each of the user devices and each of the users is assigned with a unique hardware token wherein the hardware token stores a private key assigned therewith the corresponding user device. A data to be transferred from a first user device to a second user device within the peer network is encrypted using a public key stored in a corresponding digital certificate of the second user device. In one embodiment, the data to be transferred to a second user device is compressed at the first user device using known compression techniques. For this purpose the data can be compressed using image compression, voice compression and video compression techniques based upon the type of data to be transmitted to the second user device. The encrypted data is transmitted to the second user device using the unsecured communication channel. In one embodiment, the unsecure communication channel can be a communication channel such as a PSTN or GSM channel and multiple handshaking, data integrity checking and acknowledgments is performed to avoid loss of encrypted data. At the second user device, the encrypted data is decrypted using a private key associated with the second user device to retrieve the data at the second user device. Finally, the decrypted data and logs of communication between the first user device and the second user device are encrypted using a local encryption key associated with the second user's to generate a second set of encrypted data. The second set of encrypted data is archived and stored on the second user device. Alternately, the second set of encrypted data can be stored on the hardware token associated with the second communication device.

In one embodiment, a PKI Certificate Management authority is implemented for generating and updating the digital certificates associated with the users and injecting the certificates to the Secured Hardware Tokens. The PKI Certificate Management is further enabled to manage the database for user certificates, revoke any user certificates, modify user certificates keys and manage the services assigned to every user. The secure hardware token is further enabled a plurality of cryptographic services associated therewith.

BRIEF DESCRIPTION OF THE DRAWINGS

Figure 1:
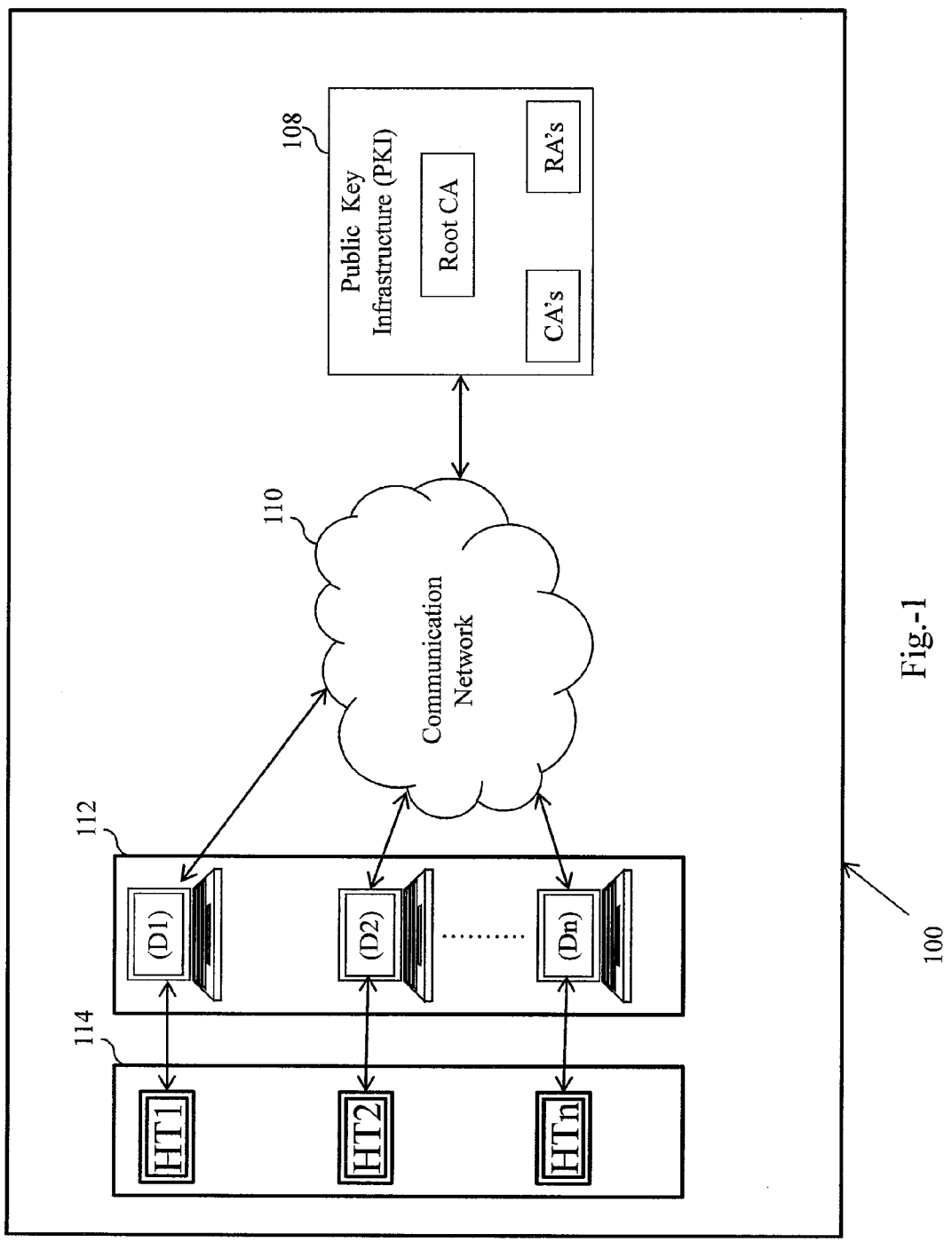
Figure 2:
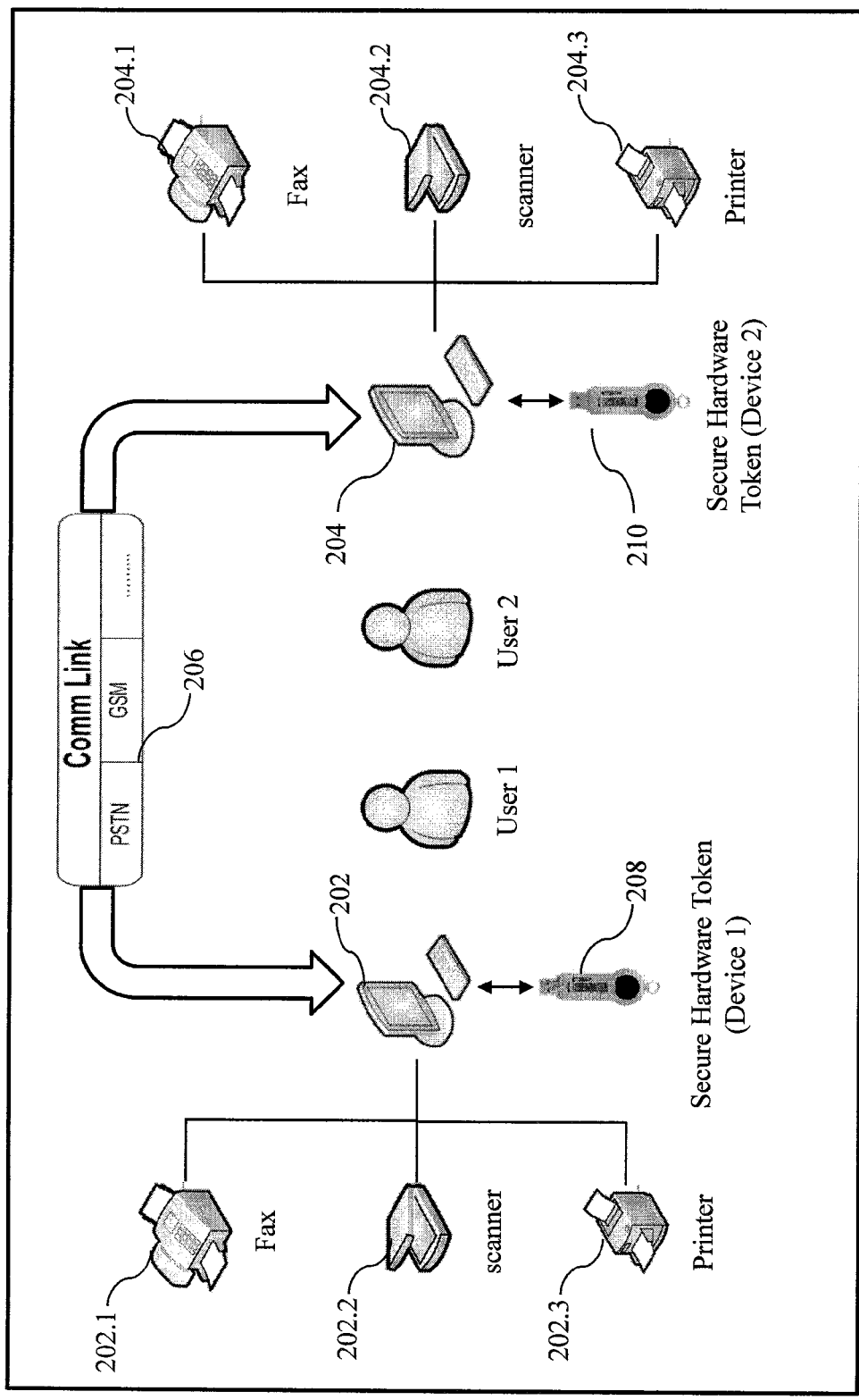
Figure 3:
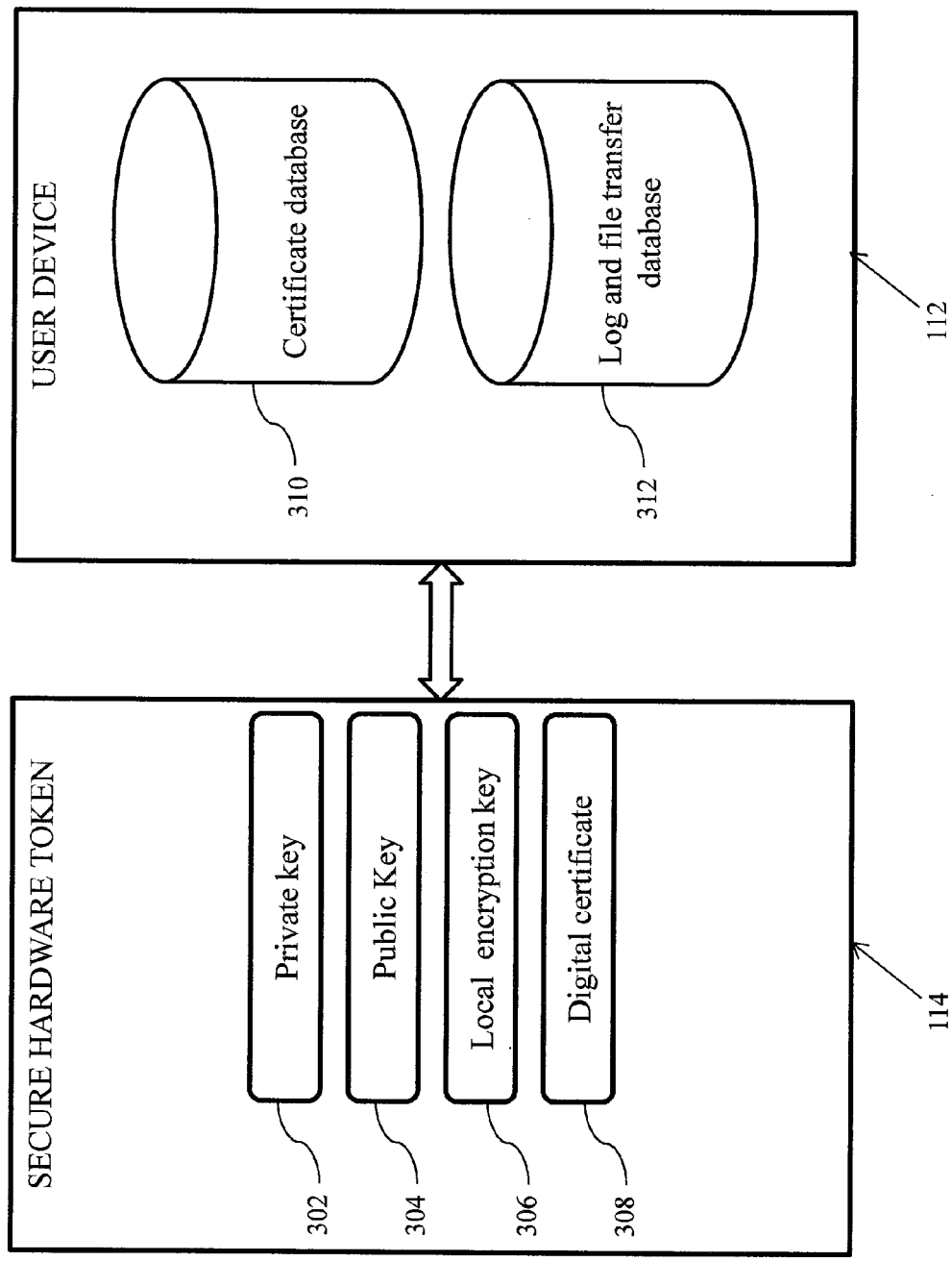
Figure 4:
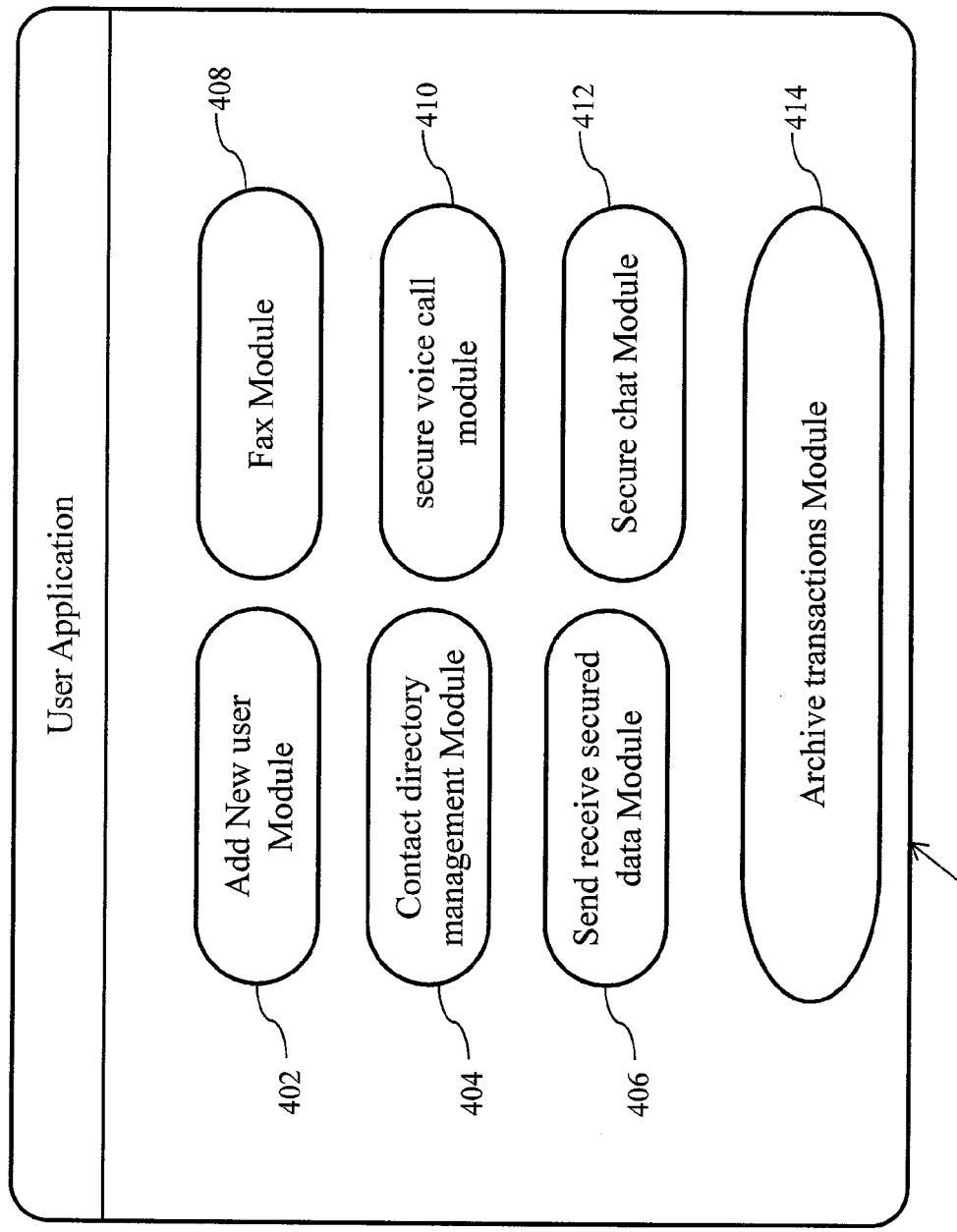
Figure 5:
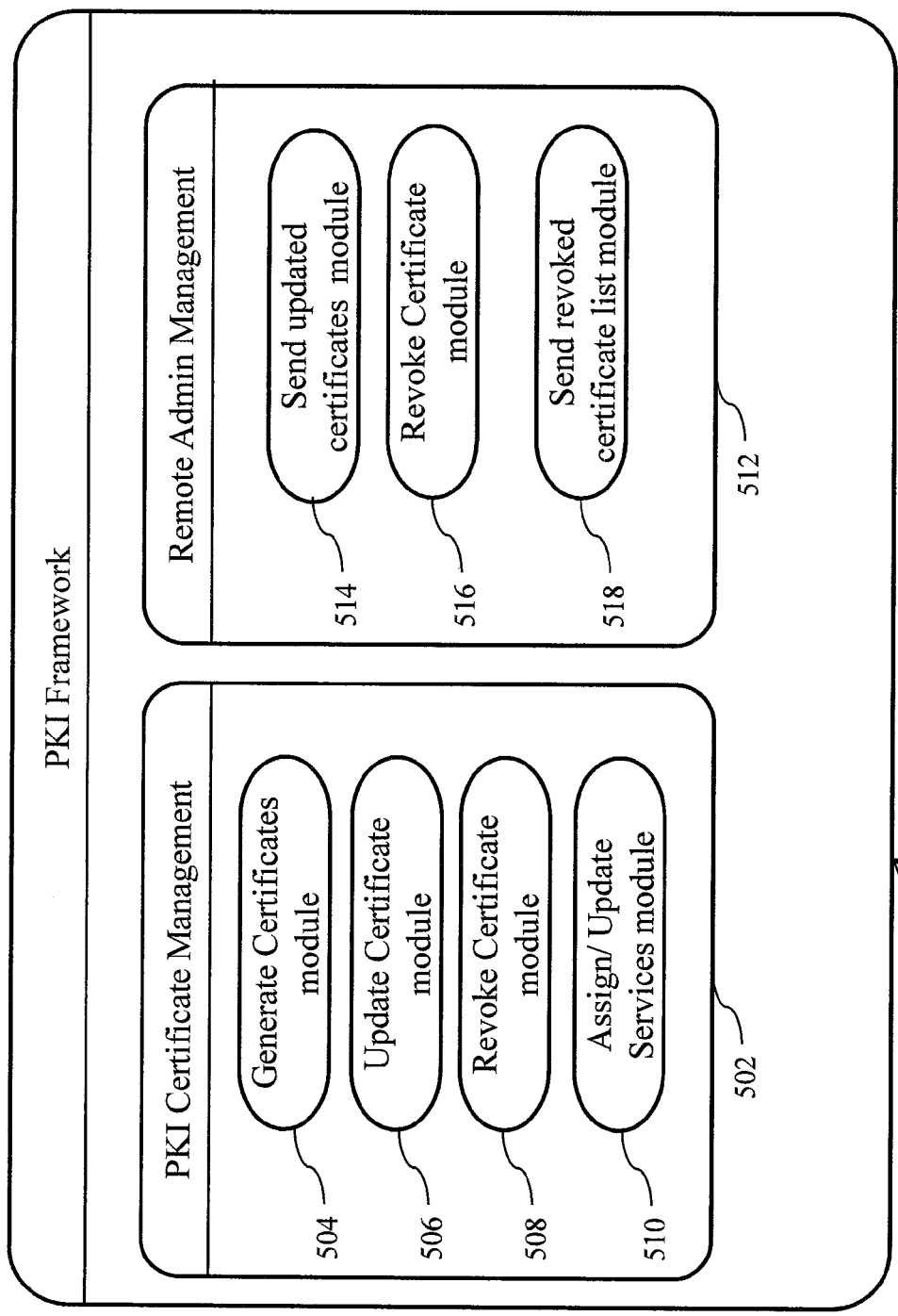
Figure 6:
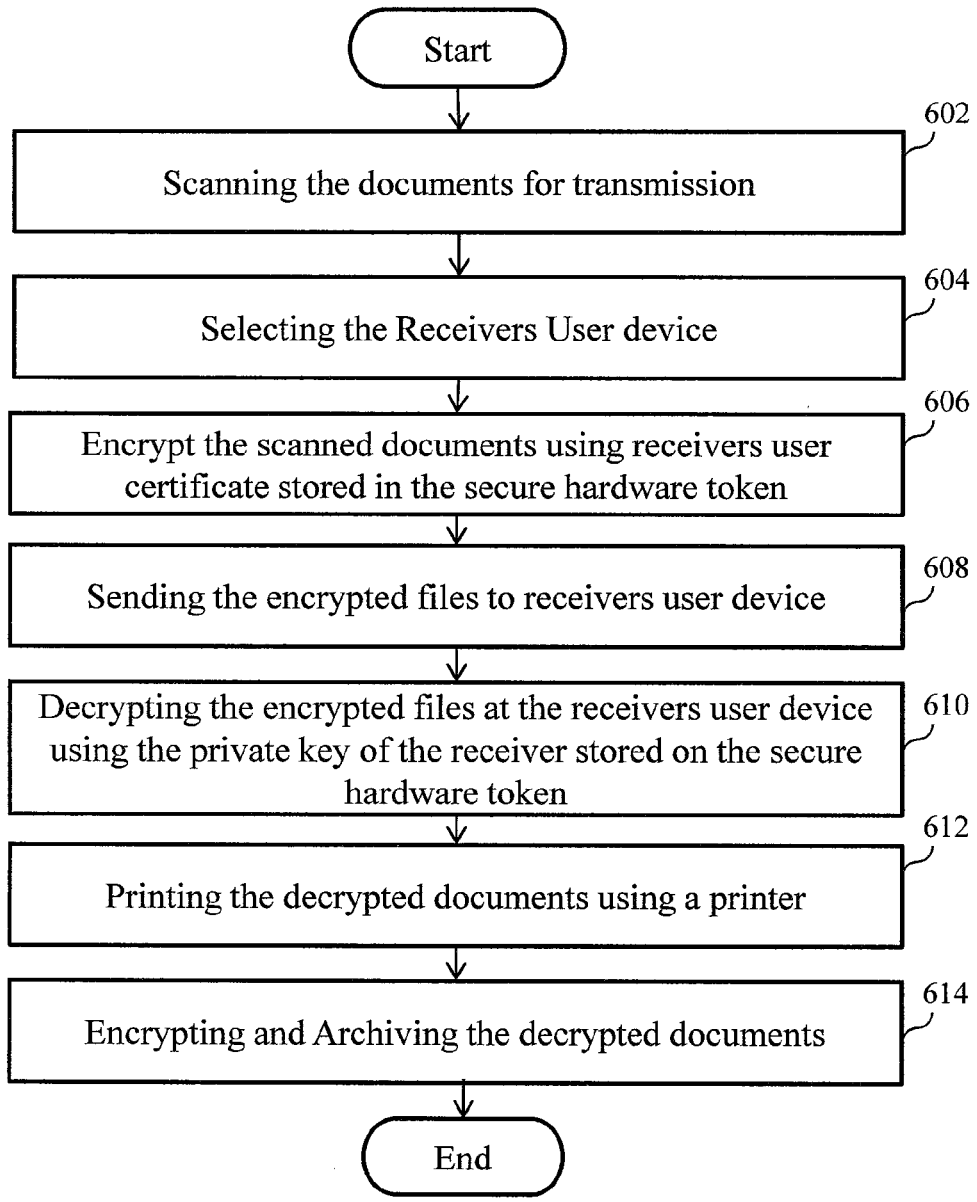
Figure 7:
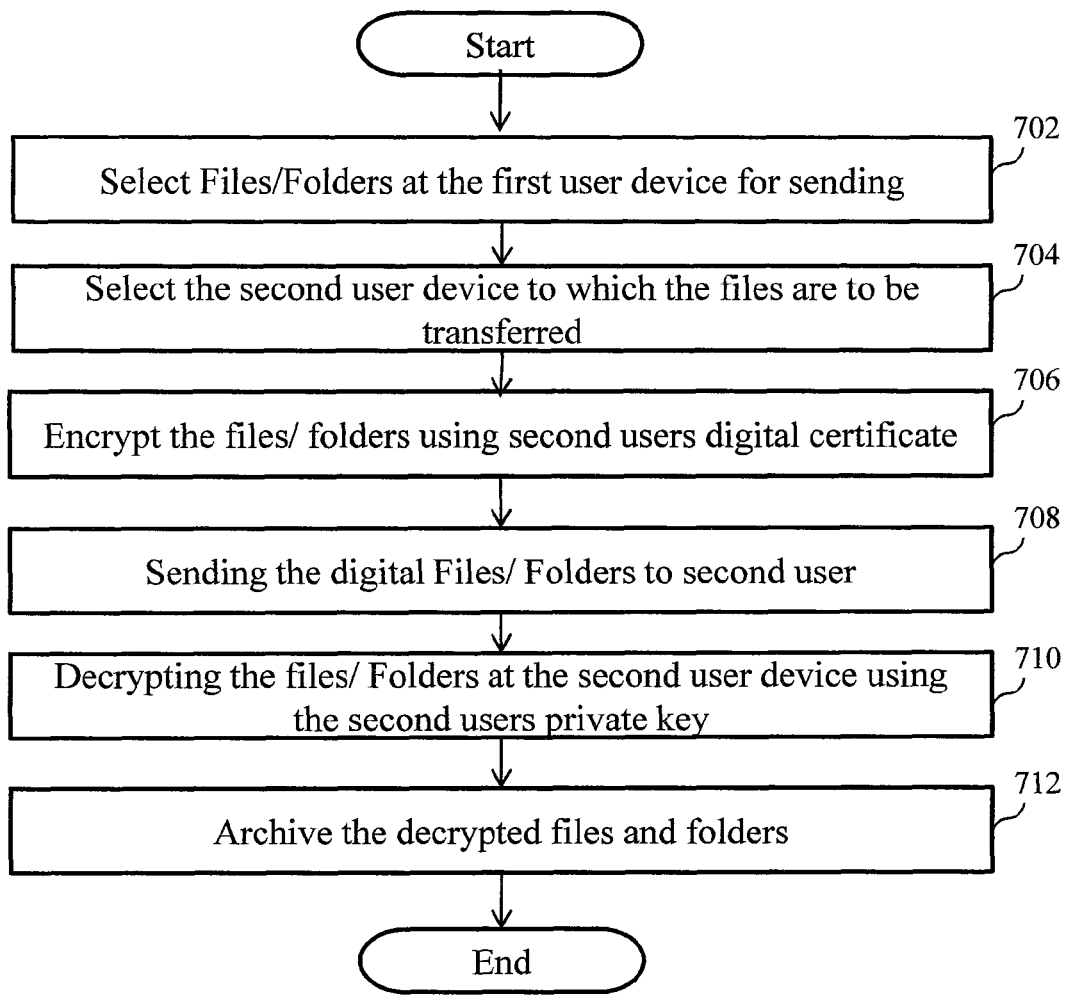
Figure 8:
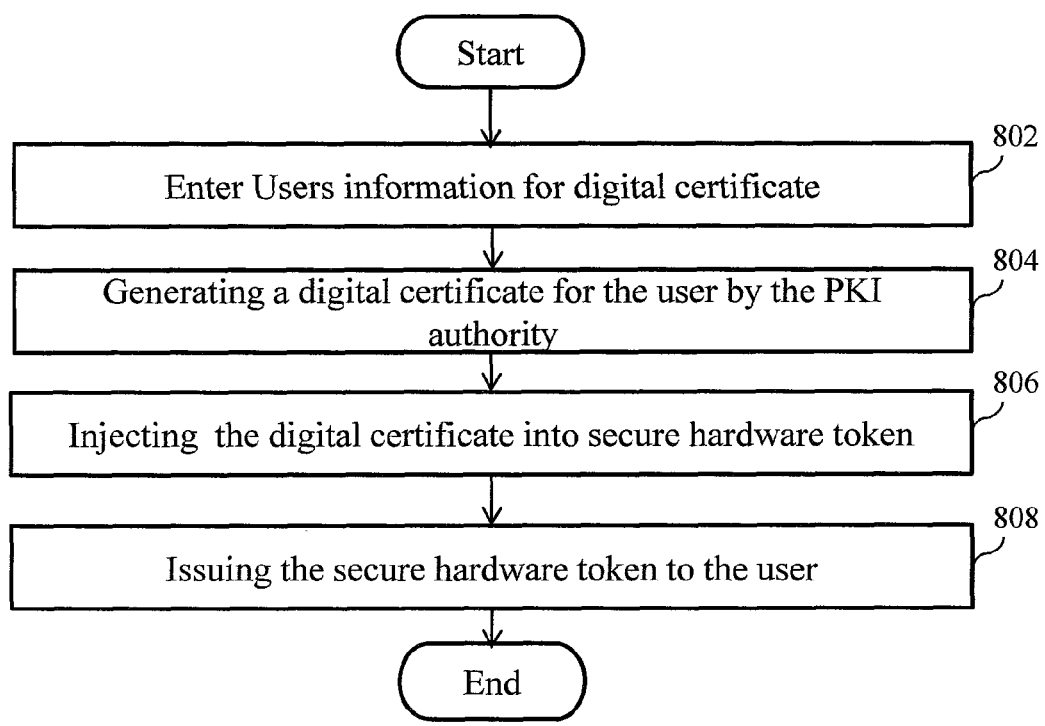

Having thus described the invention in general terms, reference will now be made to the accompanying drawings, which are not necessarily drawn to scale, and wherein:

FIG. 1 illustrates an exemplary environment of a peer network where various embodiment of the invention are enabled;

FIG. 2 illustrates the different hardware elements and network implementation for secure data transmission in the peer network;

FIG. 3 illustrates architecture of a secure hardware token;

FIG. 4 illustrates a user application over a user device to enable secure data transfer over the peer network;

FIG. 5 illustrated a Public Key Infrastructure (PKI) framework for managing the peer network for secure data transmission;

FIG. 6 illustrates a flow chart for transferring scanned documents over an unsecure communication network using the secure hardware token;

FIG. 7 illustrates a flow chart for transferring files and folders over the communication network using the secure hardware token; and FIG. 8 illustrates a flow chart for assigning the secure hardware token for each user in the PKI infrastructure.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1 illustrates an exemplary environment where various embodiments of the invention function. A peer network 100 comprising a plurality of user devices 112 starting from D1, D2 to Dn are connected over a communication network 110. In an embodiment of the invention, the user devices 112 can be anyone of a Desktop computer, a Laptop, a Server, a Tablet, a Smart phone etc. The communication network 110 can be a network communication channel such as a PSTN communication channel or a GSM communication channel. Further the communication channel can also be an internet channel over broadband line or an optical fiber line. The communication network 110 further comprises of a public key infrastructure (PKI) 108. The PKI 108 is further classified into root certification authority, certification authority, and registration authority. Each of the user devices D1 to Dn in the peer network 100 are attached with a plurality of hardware token 114 starting from HT1 to HTn respectively. Further, a set of peripheral devices are connected to each of the user devices 112 in order to capture, transmit and receive data transmitted over the peer network 100. The operations related to the peripheral devices are further explained in FIG. 2.

FIG. 2 illustrates a network implementation for secure data transmission between a first user device 202 and a second user device 204 in the peer network 100. The communication channel established between the first user device 202 and second user device 204 can be a PSTN or a GSM network communication link 206. The first user device 202 is attached with a plurality of peripheral devices including a Fax 202.1, scanner 202.2, printer 202.3, and the like. The second user device 204 is attached with a plurality of peripheral devices including a Fax 204.1, scanner 204.2, printer 204.3, and the like. The first user device 202 and the second user device 204 are enabled with a processor and a memory coupled to the processor. The memory stores a plurality of instructions executable by the processors in order to enable secure data transmission over the peer network 100. Further, a secure hardware token 208 is attached to the first user device 202 and a secure hardware token 210 is attached to the second user device 204. The secure hardware token 208 stores a private key 208.1 associated with the first user device 202 and the secure hardware token 210 stores a private key 210.1 associated with the second user device 204.

In one embodiment, each of the user devices 202 and 204 stores a plurality of digital certificates associated with each of the user devices in the peer network 100 in a certificate database. A data to be transferred from the first user device 202 to the second user device 204 is collected using the peripheral devices which may include the scanner, fax, telephone attached therewith the user device 202. The data can be collected from a chat application or a VOIP application running over the first user device. The data to be transferred from the first user device 202 to the second user device 204 is encrypted to generate a cipher text hereafter referred to as an encrypted data using a public key associated with the second user device 204. The public key associated with the second user is extracted from a digital certificates associated with the second user wherein the user device 202 maintains records of all the digital certificates in the certificate database. The encrypted data is then transferred from the first user device 202 to the second user device 204 using the communication channel 206.

In one embodiment, at the second user device 204, the encrypted data is received from the first user device 202 via the communication channel 206. At the second communication device 204, the encrypted data is decrypted using the private key 210.1 stored in the hardware token 210 in order to obtain the data in the form of plain text. The data received at the second user device and the logs of communication between the first user device 202 and the second user device 204 are encrypted using a local encryption key in order to generate a second set of encrypted data. The second set of encrypted data is further archived and stored in the Log and File transfer database. This archived data cannot be accessed by any of the members in the peer network 100 since it is encrypted using the local encryption key associated with the second user device 204 only. In one embodiment, the log and file transfer database can be maintained at the secure hardware token 210 itself. In one embodiment, the encryption and decryption steps in the process of secure data transmission can be bypassed based upon a plurality of security parameters defined by the public key infrastructure (PKI) certificate management. These parameters can be processing power of the first and the second user device, bandwidth allocation, sensitivity of data, security in the network and the like.

FIG. 3 illustrates the components in each of the secure hardware tokens 114 and the user device associated therewith. The secure hardware token 114 stores a private key 302, a public key 304, a local encryption key 306, and a digital certificate 308 associated with the first user device 202. The private key 302, public key 304, local encryption key 306, and digital certificate 308 are generated by a PKI certificate management and are maintained by a remote admin management. The functions of the PKI certificate management and remote admin management are further explained in FIG. 5.

Further, a certificate database 310 and a log and file transfer database 312 is maintained at the user devices 112. The certificate database 310 stores all the digital certificates associated with the users in the peer network 100. The remote admin management is responsible to maintain and update user certificates in the certificate database 310. The log and file transfer database 312 mains the log information and files that are received from other users in an encrypted format.

FIG. 4 illustrates a user application 400 installed over the user devices 112 in order to perform a plurality of functions for secure data transmission between user devices in the peer network 100. The user application 400 comprises of an Add new user module 402 enabled to update each of the secure hardware token with the digital certificate associated with the new user. The peer network 100 can be expanded on demand, by exchanging Digital Certificates with new users of the peer network 100. The Add new user module 402 is enabled to periodically update the hardware token with the digital certificates of new users. In one embodiment, before the updating the hardware token, the Add new user module 402 verify the authenticity of the digital certificate by contacting the root certification authority which has generated the digital certificate.

In one embodiment, a contact directory management module 404 is enabled to generate a contact directory at each of the user device 112. The contact directory maintains a list of authenticated users in the peer network 100, their latest copy of digital certificates and associated public key therewith. A send receive secure data module 406 is enabled to encrypt the data to be transferred between the user devices in the peer network 100. For this purpose, the send receive secure data module 406 uses the public key associated with the receiver user devices in order to generate a cipher text from the data. At the receiver user device the Send/receive secured data Module 406 is enabled to decrypt the encrypted data using the private key of the receiver device. In one embodiment, a fax module 408 is enabled at the user application 400 in order to generate scan document using a fax machine or a scanner, and transfer these scanned files over the PSTN or GSM network.

In one embodiment, a secure voice call module 410 is enabled to convert a voice data or a real time audio signal into a digital form. This digital format is then converted by the Send receive secured data Module 406 into an encrypted text and transferred to the receiver user device. The secure voice call module is further enabled to transform the received data in digital format into an audible format. In one embodiment, a secure chat module 412 is enabled to segregate the data from a chat application such that the Send receive secured data Module 406 can encrypt the chat data and transfer it to the secure data transmission module 406. Further, the secure chat module 412 is enabled to transfer the decrypted data at the receiver user device to the corresponding chat application. In one embodiment, the user application enables an Archive transactions module 414 in order to archive the logs of communication between the user devices and the data transferred between them.

FIG. 5 illustrates a Private Key infrastructure PKI framework 500 with two different bodies a PKI certificate management 502 and Remote admin management 512. The PKI certificate management 502 is enabled perform a plurality of high level operations associated with the PKI framework 500. The PKI certificate management 502 is a body which is enabled with a plurality of modules such as a generate certificate module 504, an update certificate module 506, a revoke certificate module 508 and assign/update services module 510. The generate certificate module 504 enables the PKI system to generate certificates for a new user. The generate certificate module 504 verifies the identity of a new user in the peer network and accordingly generates certificate for the new user. Update certificate module 506 is enabled to update the certificates associated with the users in the peer network. The Update certificate module 506 is enabled to update details such as date of expiry of the certificate, personal information, domain information, new public key and the like. The update certificate module 506 is further enabled to update each and every secure hardware token 114 automatically during next communication cycle using online resources such as the Internet. Revoke certificate module 508 is enabled to revoke expired certificates or certificates associated with user with compromised security or loss of private/Public key. Once a certificated is revoked, this information is automatically updated in the hardware tokens associated with all the users. Further the assign update services module 510 is enabled to assign at least one security service with each peer network user and update these services periodically.

In one embodiment, the remote admin management 512 is enables an updated certificate module 514 to send updated certificate to each and every user in the peer network 100 using secure means of communication. The old certificate copy is updated with the updated copy of the certificate as an when a new certificate is generated. The remote admin management 512 is enabled with a revoke certificates module 516. The revoke certificates module 516 is enabled to revoke certificates of the user devices within the peer network 100 based upon a plurality of preset criteria such as loss of hardware token, corrupt hardware token and the like. The Remote admin management 512 is further enabled with a send revoked certificate list module 518 which enables automatic update of each and every secure hardware token within the peer network 100 with a list of certificates which have been revoked.

FIG. 6 illustrates a flowchart for the process of transferring a document over the peer network 100 from a first user device to a second user device by enabling security using the hardware token. At step 602, the documents to be transferred are scanned at the sender user device. Further, the scanned documents can be compressed in order to reduce the size of document to be transferred. In one embodiment, the data is compressed by image compression, voice compression and file compression techniques based upon the type of data to be transmitted from the first user device to the second user device. At step 604, the second user device hereafter referred to as a receiver user device is selected from the list of user devices in the peer network 100. The hardware token at the first user device hereafter referred to as sender user device maintains information associated with each and every user in the peer network 100. At step 606, once the receiver user device is identified, the public key associated with the receiver user device is retrieved from certificate database 310 associated therewith. The scanned document is then encrypted using the public key associated with the receiver user device in order to generate a cipher text i.e. encrypted data of the scanned document. At step 608, this encrypted document is sent to the receiver user device using the unsecured communication channel such as PSTN or GSM. At the second user device, the encrypted document is decrypted using a private key associated with the receiver's user device stored in the secure hardware token associated therewith, at step 610. Further, at step 612 the decrypted document is printed using the printer attached to the receiver user device. At step 614, the decrypted document and logs of communication between the sender user device and receiver user device is encrypted using a local encryption key stored in the secure hardware token of the receiver user device in order to generate a second set of encrypted data. This second set of encrypted data archived and stored in the Log and file transfer database of the receiver user device.

FIG. 7 illustrates a flowchart for the process of transferring a files and folders over the peer network 100 from a sender user device to a receiver user device by enabling security using the secure hardware token. At step 702, the files/folder to be transferred from the first user device to the second user device are selected. The files/folder can be compressed in order to reduce the size of the data to be transferred in the peer network 100. At step 704, the receiver user device is selected from the list of user devices in the peer network 100. The secure hardware token at the sender user device maintains digital certificated associated with each and every user in the peer network 100 in a certificate database 310. At step 706, once the receiver user device is identified, the public key associated with the receiver user device is retrieved from the certificate database associated with the user device. The files/Folders are then encrypted using the public key associated with the receiver user device in order to generate a cipher text i.e. encrypted files/Folders. At step 608, this encrypted files/Folders are sent to the receiver user device using the unsecured communication channel such as PSTN or GSM. For this purpose, multiple handshaking, data integrity checking and acknowledgments is enabled to avoid loss of data. At the second user device, the encrypted files/folders are decrypted using a private key associated with the receiver's user device stored in the secure hardware token at step 610. Further, at step 612 the decrypted files/folders and logs of communication between the sender user device and receiver user device is encrypted using a local encryption key stored in the secure hardware token in order to generate a second set of encrypted data. This second set of encrypted data is archived and stored in the Log and file transfer database of the receiver user device.

FIG. 8 illustrates a flowchart for generating hardware token for a new user in the PKI Framework. For this purpose, at step 802, information associated with the new user is accepted and verified for the generation of digital certificate. This information may include name, location, age, email ID, and role as an employee. At step 804, the PKI certificate management of the PKI framework generates a digital signature associated with the new user in the peer network 100. For this purpose, a pair of private key and public key is generated by the PKI certificate management. The public key and the information extracted from the user are embedded in the digital certificate. At step 806, the digital certificate is injected into a new hardware token. The private key of the user and a local encryption key are also injected into the hardware token. Further, a certificate database storing digital certificates associated with all the users in the peer network 100 is also transferred to the user device of the new user. The hardware token is issued to the new user at step 808. All the other user devices associated with other users of the peer network 100 are updated with the digital certificate of the new user. In one embodiment, a single point administration process can be implemented in order to add the new user into the peer network 100.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, mini-computers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for secure data transmission over an unsecured communication channel by
    enabling public key cryptography, the method comprising processor implemented steps
    of:
    storing a plurality of digital certificates associated with a plurality of user devices within a peer network over a plurality of secure hardware tokens;
    assigning each of the plurality of user devices a corresponding secure hardware token; encrypting a data to be transferred from a first user device to a second user device within the peer network, using a public key stored in a corresponding digital certificate of the second user device;
    transmitting the encrypted data to the second user device using the unsecured communication channel; decrypting the encrypted data at the second user device using a private key associated with the second user device to retrieve the data at the second user device;
    encrypting the decrypted data and logs of communication between the first user device and the second user device using a local encryption key associated with the second user to generate a second set of encrypted data;

Archiving and/or storing the second set of encrypted data on a log and file transfer database of the second user device; wherein a PKI Certificate Management is implemented over the peer network to generate and update the certificates for the user devices and inject the certificates to the user devices; wherein the encryption and decryption steps are bypassed based upon a plurality of security parameters defined by the public key infrastructure certificate management and one of the method steps is implemented by a hardware processor.

2. The method of claim 1, wherein a Remote Admin Management Application implemented over the peer network is enabled to update every user device with a list of revoked certificates and a plurality of services assigned to the users.

3. The method of claim 1, wherein a Public Key Infrastructure (PKI) is used for generating and transferring the digital certificates to the user devices.

4. The method of claim 1, wherein the digital certificate is issued to a new user device of the peer network and distributed across other user devices in the peer network using a single point administration process, wherein peer network can be expanded on demand by exchanging Digital Certificates to new users of the peer network.

5. The method of claim 1, wherein the encrypted data is transmitted over a medium such as a PSTN or a GSM network by enabling multiple handshaking, data integrity checking and acknowledgments to avoid loss of data.

6. The method of claim 1, wherein the data is compressed by image compression, voice compression and file compression techniques based upon the type of data to be transmitted from the first user device to the second user device.

7. The method of claim 1, wherein the log and file transfer database can be maintained at each of the user device or the hardware token associated therewith.

8. The method of claim 1, wherein each of the secure hardware token is further enabled to store the private key associated with the user device to which the secure hardware token is assigned and a plurality of cryptographic services associated therewith.

9. The method of the claim 1, wherein the PKI Certificate Management is further enabled to manage a database for user certificates, revoke any user certificates, modify user certificates keys and manage the services assigned to every user device of the peer network.

10. A system for secure data transmission over an unsecured communication channel by enabling cryptographic technique, the system comprising:
 a hardware processor;
 a memory device coupled to the hardware processor, the memory device comprising instructions executable by the hardware processor for:
 storing a plurality of digital certificates associated with a plurality of user devices within a peer network over a plurality of secure hardware tokens;
 assigning each of the plurality of user devices a corresponding secure hardware token; encrypting a data to be transferred from a first user device to a second user device within the peer network, using a public key stored in a corresponding digital certificate of the second user device transmitting the encrypted data to the second user device using the unsecured communication channel;
 decrypting the encrypted data at the second user device using a private key associated with the second user device to retrieve the data at the second user device;
 encrypting the decrypted data and logs of communication between the first user device and the second user device using a local encryption key associated with the second user to generate a second set of encrypted data; and
 archiving and/or storing the second set of encrypted data on a log and file transfer database of the second user device; wherein a PKI Certificate Management is implemented over the peer network to generate and update the certificates for the user devices and inject the certificates to the user devices; wherein the encryption and decryption steps are bypassed based upon a plurality of security parameters defined by the public key infrastructure certificate management.

11. The system of claim 10, wherein a Remote Admin Management Application implemented over the peer network is enabled to update every user device with a list of revoked certificates and a plurality of services assigned to the users.

12. The system of claim 10, wherein a Public Key Infrastructure (PKI) is used for generating and transferring the digital certificates to the user devices.

13. The system of claim 10, wherein the digital certificate is issued to a new user device of the peer network and distributed across other user devices in the peer network using a single point administration process, wherein peer network can be expanded on demand by exchanging Digital Certificates to new users of the peer network.

14. The system of claim 10, wherein the encrypted data is transmitted over a medium such as a PSTN or a GSM network by enabling multiple handshaking, data integrity checking and acknowledgments to avoid loss of data.

15. The system of claim 10, wherein the data is compressed by image compression, voice compression and file compression techniques based upon the type of data to be transmitted from the first user device to the second user device.

16. The system of claim 10, wherein the log and file transfer database can be maintained at each of the user device or the hardware token associated therewith.

17. The system of claim 10, wherein each of the secure hardware token is further enabled to store the private key associated with the user device to which the secure hardware token is assigned and a plurality of cryptographic services associated therewith.

18. The system of the claim 10, wherein the PKI Certificate Management is further enabled to manage a database for user certificates, revoke any user certificates, modify user certificates keys and manage the services assigned to every user device of the peer network.

\* \* \* \* \*